United States Patent
Fischer et al.

(10) Patent No.: US 6,168,881 B1
(45) Date of Patent: Jan. 2, 2001

(54) LATCH MECHANISM FOR A BATTERY OPERATED POWER TOOL

(75) Inventors: Ernest Fischer, Skokie; Alston Williams, Chicago, both of IL (US)

(73) Assignee: S-B Power Tool Company, Chicago, IL (US)

( * ) Notice: Under 35 U.S.C. 154(b), the term of this patent shall be extended for 0 days.

(21) Appl. No.: 09/134,122

(22) Filed: Aug. 14, 1998

(51) Int. Cl.⁷ .................................................. H01M 2/10
(52) U.S. Cl. ........................... 429/97; 429/100; 429/123; 292/219
(58) Field of Search ............................. 429/96, 97, 100, 429/123; 292/219; 364/708.1

(56) References Cited

U.S. PATENT DOCUMENTS

| | | | |
|---|---|---|---|
| 3,999,110 | 12/1976 | Ramstrom et al. | 320/2 |
| 4,678,215 | 7/1987 | Rehbein et al. | 292/247 |
| 4,835,410 | 5/1989 | Bhagwat et al. | 307/64 |
| 4,880,713 | 11/1989 | Levine | 429/100 |
| 5,116,699 * | 5/1992 | Miyajima | 429/100 |
| 5,202,197 * | 4/1993 | Ansek et al. | 429/123 X |
| 5,213,913 | 5/1993 | Anthony, III et al. | 429/97 |
| 5,225,293 * | 7/1993 | Mitchell et al. | 429/97 |
| 5,368,954 | 11/1994 | Bruns | 429/97 |
| 5,400,987 * | 3/1995 | Ziavras | 292/219 X |
| 5,401,592 | 3/1995 | Gilpin et al. | 429/97 |
| 5,415,955 | 5/1995 | Kobayashi et al. | 429/97 |
| 5,553,675 | 9/1996 | Pitzen et al. | 173/217 |
| 5,589,288 | 12/1996 | Coulson et al. | 429/96 |
| 5,604,050 | 2/1997 | Brunette et al. | 429/97 |
| 5,607,792 | 3/1997 | Garcia et al. | 429/97 |
| 5,663,011 | 9/1997 | Bunyea et al. | 429/97 |
| 5,683,831 | 11/1997 | Baril et al. | 429/96 |
| 5,718,985 | 2/1998 | Bunyea et al. | 429/97 |
| 5,741,305 | 4/1998 | Vincent et al. | 607/5 |

* cited by examiner

*Primary Examiner*—Stephen Kalafut
(74) *Attorney, Agent, or Firm*—Gardner Carton & Douglas

(57) ABSTRACT

A battery operated power tool having a power tool housing, a battery pack and a battery latch mechanism. The power tool housing has a recess and a latching surface formed into the outer surface of the housing. The battery pack holds battery cells to power the tool. The battery latch mechanism removably attaches the battery pack to the power tool housing and includes a latching member and a spring to bias the latching member between an engaged position where the latching member is connected to the power tool housing and a release position when the latching member is disconnected from the power tool housing. The latching member includes an inner and an outer side with a latch flange on the inner side at one end. Towards an opposing end, the latching member includes a pushing surface on the outer side.

31 Claims, 7 Drawing Sheets

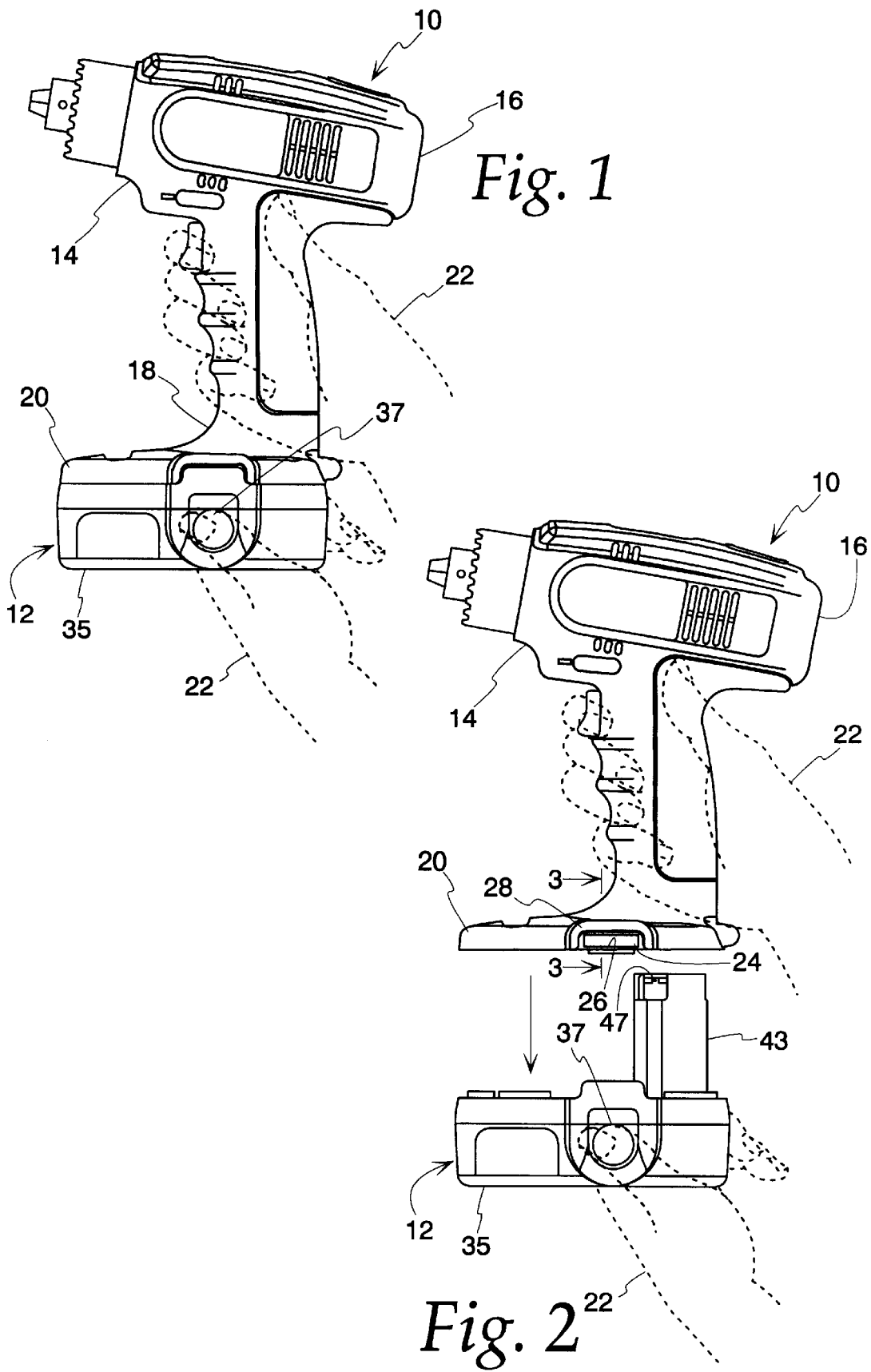

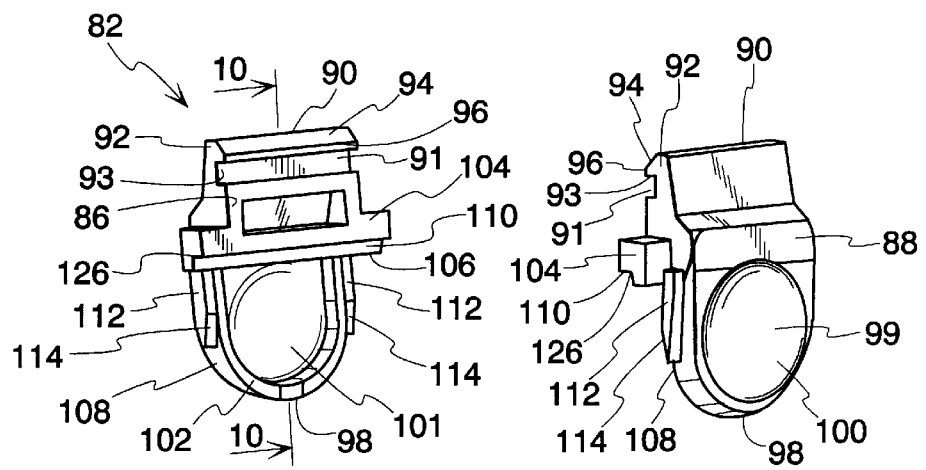
Fig. 7
Fig. 8
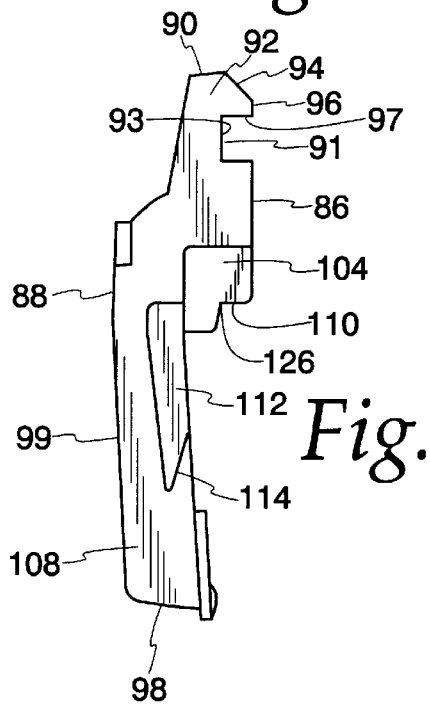
Fig. 9
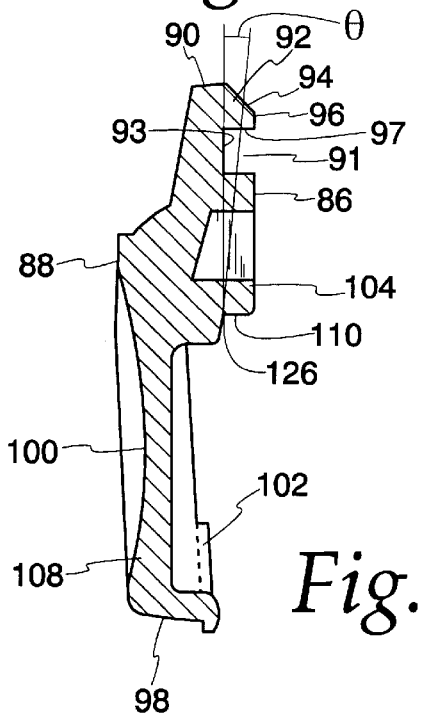
Fig. 10
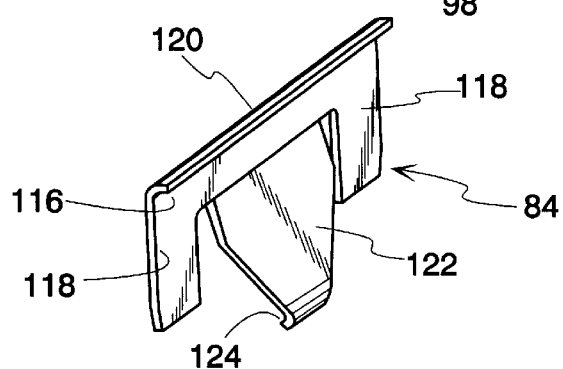
Fig. 11

LATCH MECHANISM FOR A BATTERY OPERATED POWER TOOL

BACKGROUND OF THE INVENTION

1. Field of the Invention

The present invention relates to battery operated power tools and, in particular, relates to a latch mechanism to attach the battery pack to a power tool.

2. Scope of the Prior Art

Powers tools, such as drills, screwdrivers, saws, etc., have long been used by professional builders, amateur fix-it people, and others. Electric power tools can be powered by an AC power source using an electrical cord and connector that is a part of the power tool. As battery technology has improved, power tools are now commonly powered by battery packs. The battery pack improves the mobility of the power tool by avoiding the need to use cumbersome extension cords. As the use of battery operated tools have increased, the demand to supply ever-increasing power to the battery operated power tools has also increased. This demand in increased power has increased the weight of the battery pack and therefore the weight of the power tool. Thus, power tool manufacturers have redesigned the shape and weight distribution of power tools to accommodate the size and weight of the battery packs.

For the power tool to continue operating, the batteries must be recharged. Accordingly, the battery pack must be removable from the power tool. A battery latch mechanism is therefore provided on the power tool or the battery pack. The latch mechanism secures the battery pack in a mechanically and electrically coupled position to the power tool so that the power tool has the necessary power to operate for its intended use. The battery latch mechanism must be appropriately strong to hold the battery pack in mechanical and electrical coupling during the rigors of use. In addition, the latch mechanism must be easy to maneuver so that the battery pack can be removed from the power tool for recharging.

Moreover, the battery latch mechanism should be designed so that the power tool operator can easily remove the battery pack while holding the power tool. Traditionally, the battery pack is positioned at the base of the power tool. In one example of the prior art, the battery pack is provided with a latch mechanism. The latch mechanism is positioned along the top edge of the battery pack where the pack mates with the power tool. The mechanism includes a pushing surface at its lower end and a latching flange at the top end. Below the pushing surface and in the battery pack housing, a spring is positioned to bias the mechanism into a position that secures the battery pack to the power tool. That latching surface of the power tool is oriented on the inside of the power tool housing. When the pushing surface is pressed, the latch mechanism moves about the lower end and the latch flange disengages with the latching surface.

When the battery pack needs to be removed from the power tool, the operator holds the hand grip portion of the power tool with one hand. In the other hand, the operator holds the bottom of the battery pack and cradles the battery pack in the throat of the hand between the index finger and thumb. The tip of the index finger and thumb are placed on the battery latch mechanism and maneuvered to disengage the latch mechanism from the power tool thereby removing the battery pack from the power tool. Latch mechanisms of this sort are difficult to use because they move about a point below the pushing surface within the housing of the battery pack. In other words, as the latch mechanism is pushed into the housing of the battery pack the latch flange of the latch mechanism is also pushed in away from the latching surface of the power tool housing. The spring force for this type of latch mechanism is below the pushing surface. As the battery packs get larger and heavier, the spring force must be increased and the latch mechanism of this design becomes harder to use. Of course, the battery pack must have sufficient space to accommodate the size of the spring. Moreover, the pushing surface must remain at the top of the battery pack housing because the location of the spring presents design constraints. When the operator places the hand in the hand throat underneath the battery pack the leverage available at the fingertips is not always sufficient to bias the spring to therefore remove the battery pack.

In another prior art battery pack latch mechanism, a clip is connected to the housing of the power tool. The clip pivots about a point on the power tool between an engaged position and a release position. In the engaged position the clip is connected to the battery pack housing to secure the battery pack into its electrically coupled position. In the release position, the clip is disengaged and pivoted from the battery pack so that the battery pack can be removed from the power tool. As the battery packs have become heavier from increasing battery size, the clip has become stiffer and therefore harder to use.

Although battery packs are becoming larger, smaller and less powerful battery packs are still used. Different types of power tools also require different designs of battery packs. Power tool manufacturers therefore have many different battery pack sizes and designs which may require different types of battery latch mechanisms. These different designs increase the cost for battery packs.

SUMMARY OF THE INVENTION

Accordingly, the present invention provides a latch mechanism for a battery operated power tool that avoids the disadvantages of the prior art. Therefore, the present invention relates to a battery latch mechanism that is easy to use regardless of the battery size and that allows the battery pack to fit in the throat of a hand. In addition, the present invention provides a latch mechanism that is not stiff to use regardless of the size of the battery pack.

In accordance with the objects of the invention, a power tool is provided that has a power tool housing. The power tool housing has an upper portion where a motor is provided, a grip portion to be gripped by an operator, and a base. A recess is provided into the outer surface of the power tool housing. The bottom of the recess can serve as a latch surface.

In order to power the power tool, a battery pack is provided that electrically and mechanically couples with the power tool. The battery pack has an upper and lower housing to define a container into which battery cells are placed.

The battery pack includes a battery latch mechanism to electrically and mechanically secure the battery pack to the power tool. The battery latch mechanism comprises a latch member and a spring. The spring fits into the lower housing and is positioned to bias the latch mechanism in an engaged position. The latch member fits into a space provided in the lower housing and is positioned on top of the spring. The latch member includes an outer side and an inner side wherein the inner side faces the inside of the housing and the outer side is approximately flush with the outer surface of the housing. A latch flange is provided on the inner side of the latch member at the upper end of the latch member. A pushing surface is provided toward the opposing lower end on the outer side of the latch mechanism. A pivot axis is oriented width-wise across the latch member between the latch flange and the pushing surface.

As stated, the latch mechanism is biased by the spring into an engaged position so that the latch flange is positioned within the recess and connected to the latch surface on the power tool housing. In order to remove the battery pack from the power tool, the latch mechanism is pivoted from an engaged position to a release position. To pivot the latch mechanism, the pushing surface is pushed into the battery pack housing against the spring. By pushing the pushing surface, the latch mechanism rotates around the pivot axis so that the latch flange disengages from the latch surface provided on the power tool. The battery pack can therefore be mechanically and electrically decoupled from the power tool.

To reconnect the battery pack to the power tool, the latch mechanism can be snap engaged into the latch surface. Alternatively, the pushing surface can be depressed so that the latch flange is in the release position and away from the latching surface. When the battery pack is in the correct position to electrically couple the battery pack to the power tool, the latch mechanism is released and the latch flange moves to the engaged position to engage with the latching surface of the power tool housing. The battery pack is then in position for the power tool to operate.

These and numerous other features and advantages of the present invention will become readily apparent from the following description, the accompanying drawings and the appended claims.

BRIEF DESCRIPTION OF THE DRAWINGS

FIG. 1 illustrates a power tool with the battery pack connected to the power tool having a latch mechanism made in accordance with the principles of the present invention;

FIG. 2 illustrates a power tool with the battery pack disconnected from the power tool;

FIG. 7 is a prospective view of the inner side of the latch member made in accordance with the principles of the present invention;

FIG. 8 is a prospective view of the outer side of the latch member;

FIG. 9 is a side view of the latch member;

FIG. 10 is a cross sectional view of the latch member taken along the line 10—10 in FIG. 7;

FIG. 11 is a prospective view of the spring made in accordance with the principles of the present invention;

DETAILED DESCRIPTION OF THE PREFERRED EMBODIMENT

FIGS. 1 and 2 illustrate a power tool 10 that includes a battery pack 12. The power tool 10 illustrated is a battery operated electric drill. The principles of the present invention can be used with many types of power tools such as saws, screwdrivers, or any other power tool which uses a power pack. The operation of the power tool 10 is readily known in the prior art.

Figure 3:
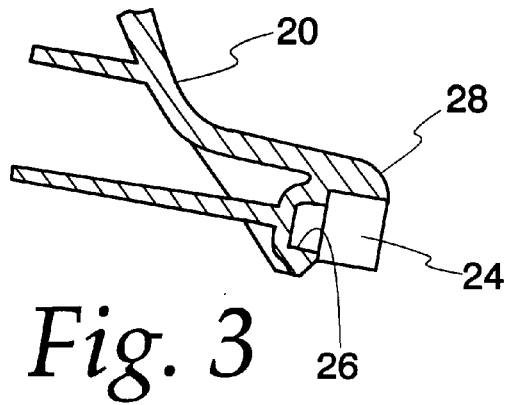
FIG. 3 is a cross-sectional view of the latching surface and recess provided on the power tool housing taken along the line 3—3 in FIG. 2.

The power tool shown in FIGS. 1 and 2 includes a power tool housing 14. The power tool housing 14 contains the motor (not shown) and other elements that are necessary to operate the power tool, all of which are known in the prior art. Extending below an upper portion 16, the power tool housing 14 includes a grip portion 18 that has a base 20 formed integrally at the opposing end of the grip 18. The housing 18 can be made of any suitable material including glass-filled nylon. As seen in the figures, a hand 22 holds the power tool around the grip portion 18. The battery pack 12 is connected to the power tool housing 14 at the base 20. As seen in FIG. 2, and in detail in FIG. 3, the power tool housing 14 includes a recess 24 along the base 20. The recess 24 is formed into the outer surface of the power tool housing 14. Along the bottom of the recess 24, a latching surface 26 is provided. At the base 20, the power tool housing 14 includes a C-shaped protrusion 28 to shield the recess 24 and latching surface 26.

Figure 4:
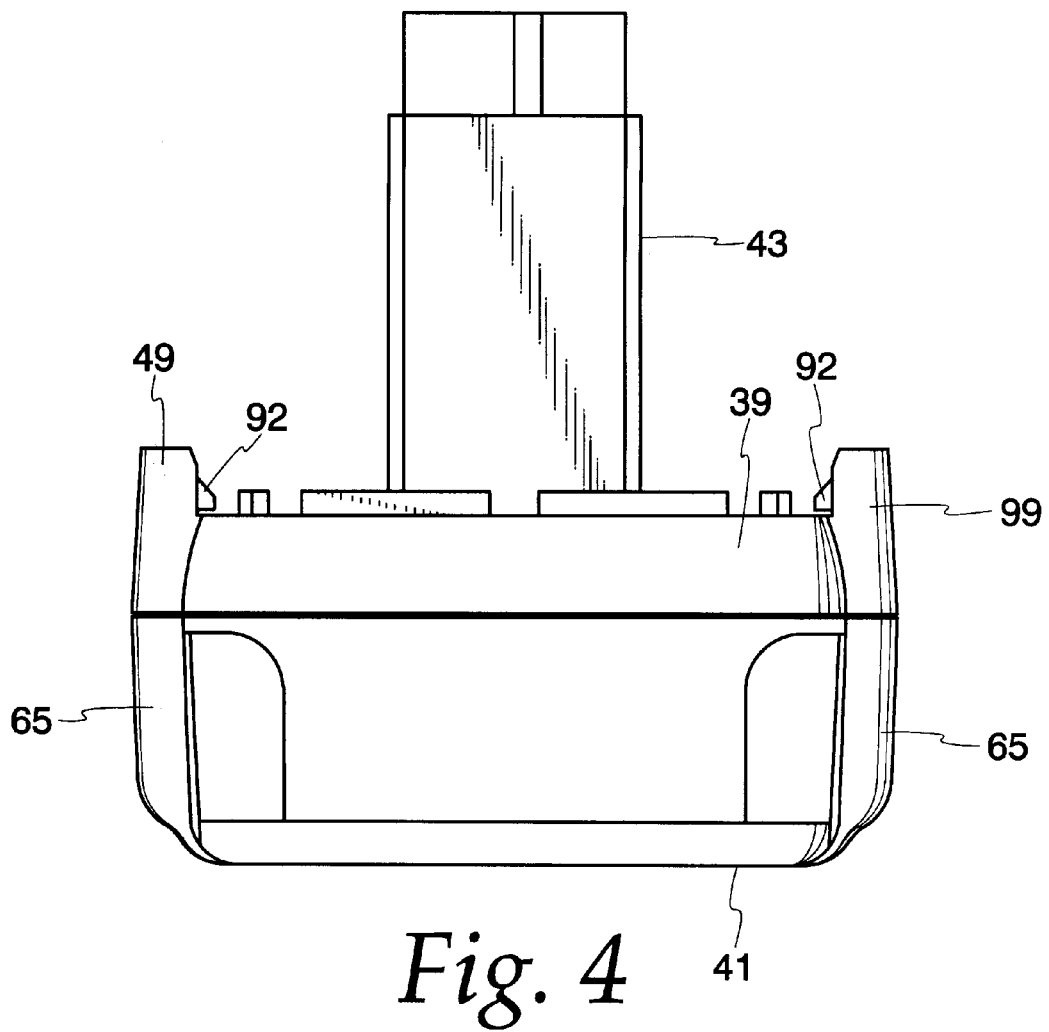
FIG. 4 is an end view of the battery pack housing made in accordance with the principles of the present invention.
Figure 5:
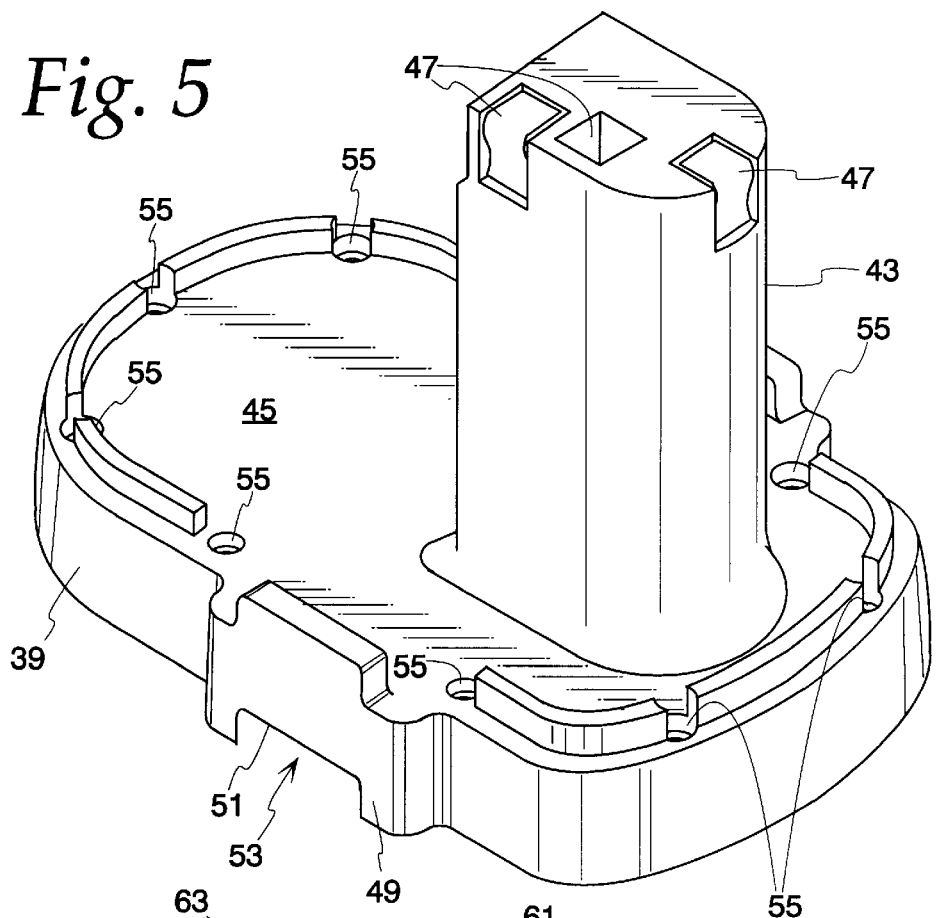
FIG. 5 is a prospective view of the upper portion of the battery pack housing.
Figure 6:
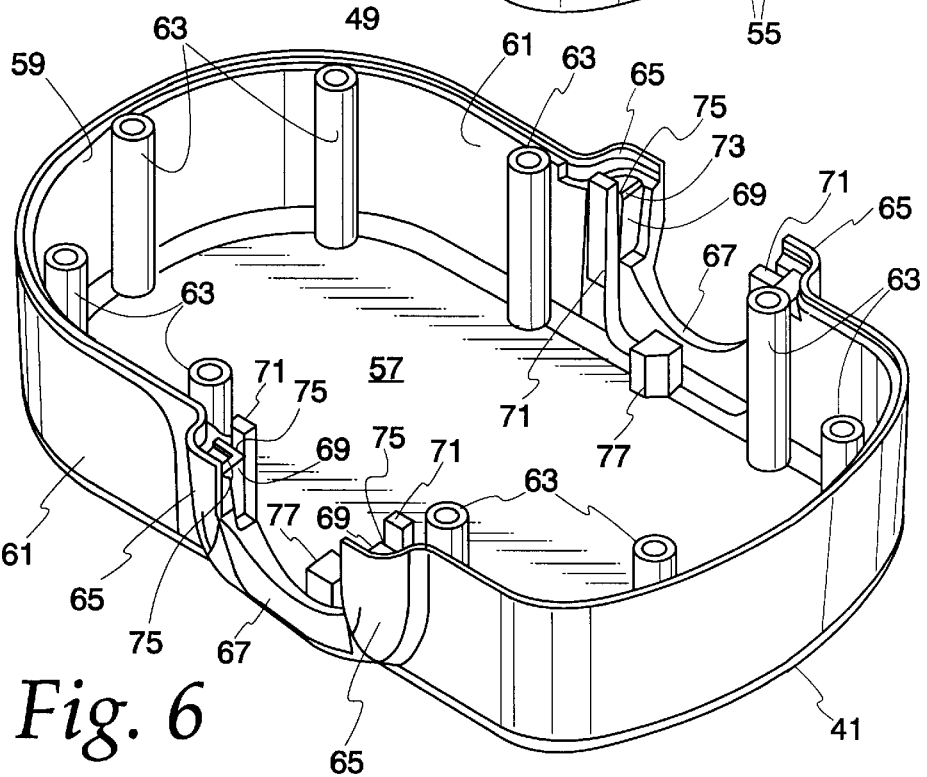
FIG. 6 is a prospective view of the lower portion of the battery pack housing.
Figure 17:
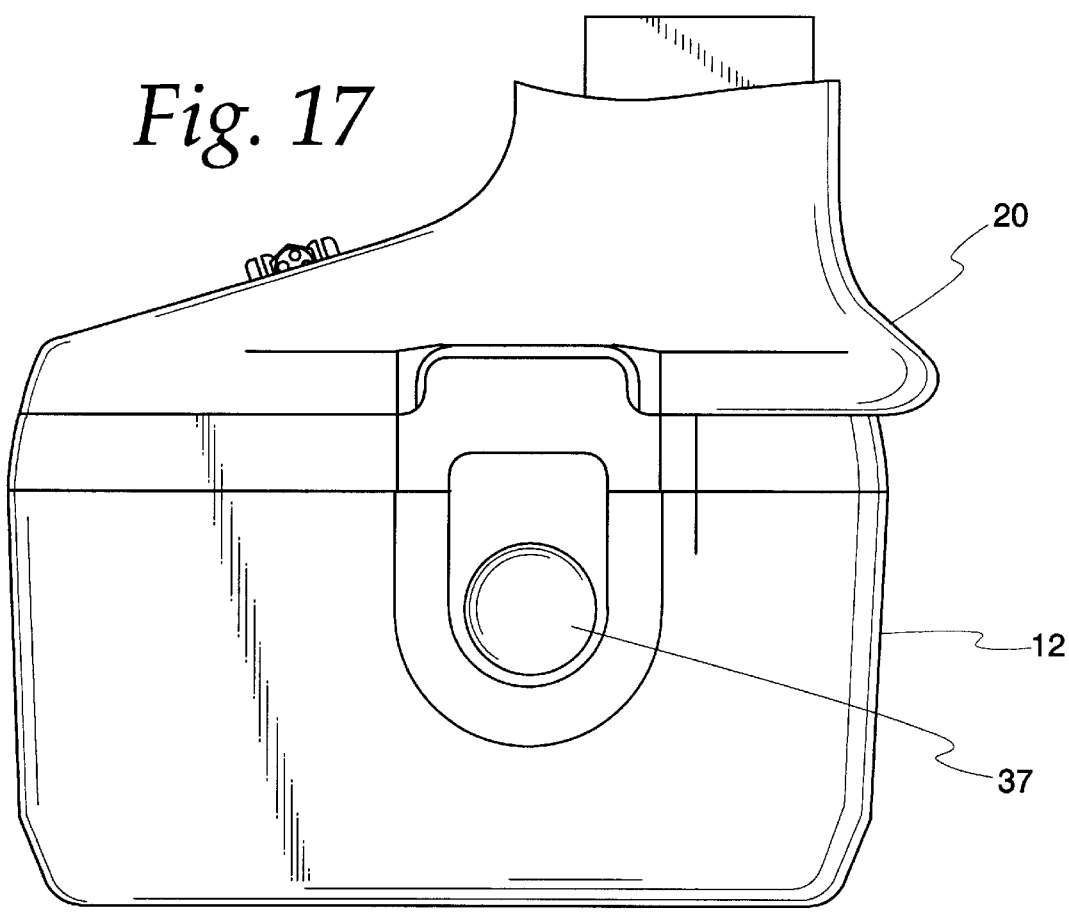
FIG. 17 illustrates yet another embodiment of the present invention.
Figure 16:
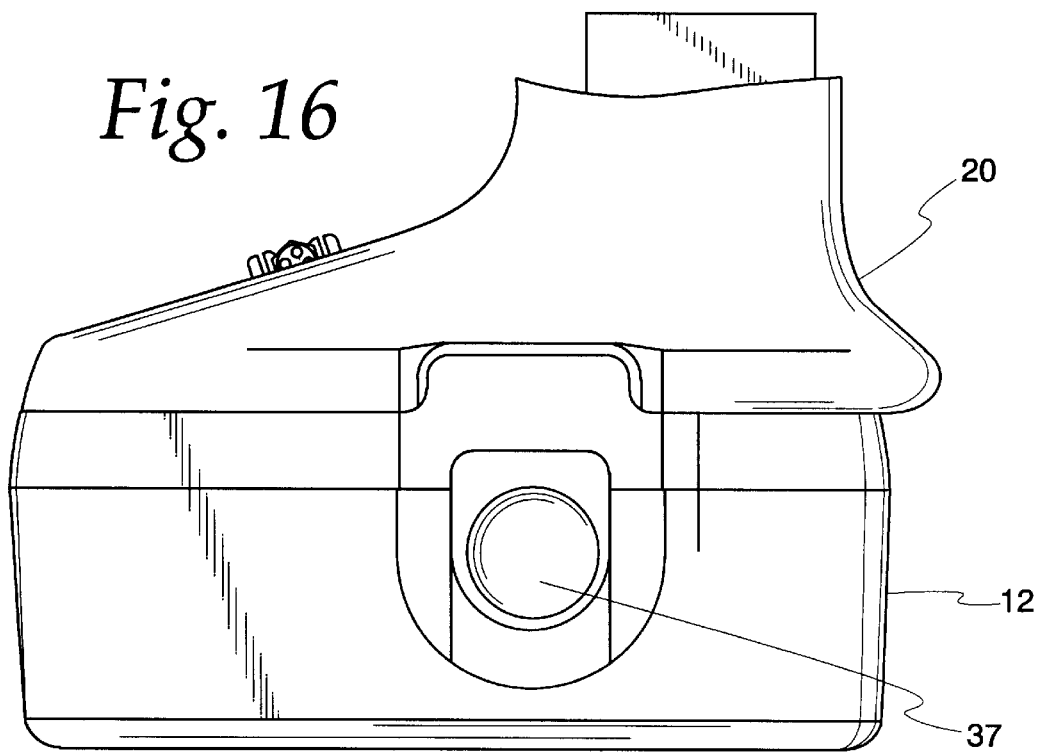
FIG. 16 illustrates an alternative embodiment of a battery pack connected to a power tool made in accordance with the principles of the present invention.

Turning to FIGS. 4–6, the battery pack 12 made in accordance with the principles of the present invention includes a battery pack housing 35, a battery latch mechanism 37, and multiple battery cells (not shown). The battery latch mechanism 37 used by the present invention is designed to mechanically, and thereby electrically, couple the battery pack 12 to the power tool 10. When the battery pack is properly connected, the battery pack provides the necessary power for the power tool 10 to operate. The shape of the battery pack housing 35 is designed to optimally hold multiple battery cells (not shown) necessary to power the tool 10. Depending on the size of the battery pack housing 35 and the requirements of the power tool 10, the battery pack holds enough battery cells to provide a battery housing between 7.2 to 24, or more, volts. A battery pack for an 18V battery is seen in FIGS. 1 and 16. Battery packs for a 24V battery are seen in FIG. 17.

Referring back to FIG. 5, a neck 43 extends from the top surface 45 of the upper housing portion 39. At the top of the neck 43, the necessary electrical couplings 47 are arranged so that the battery cells can provide the necessary electrical source to power tool 10. As is known in the prior art, the neck 43 is inserted into the base 20 and grip portion 18 of the power tool. The upper housing portion also has a hood portion 49 positioned along the outer perimeter. The hood portion 49 has an arched indentation 51 along the bottom edge. The hood 49 and arched indentation 51 creates a hood area 53 into which a portion of the battery latch mechanism 37 is enclosed, as will be described below. Around the perimeter of the top surface 45, multiple screw holes 55 are arranged.

The lower housing portion 41 includes a floor 57 as the base to the battery pack housing 35. Perpendicular to the perimeter of the floor 57, the lower housing portion 41 includes a wall 59 which has opposing sides 61. Adjacent the inner side of the wall 59 of the lower housing portion 41 has a multiple screw sheaths 63 projecting up from the floor 57 to an end approximately the height of the wall 59. On opposing sides 61, shoulders 65 protrude out from the lower housing. The shoulders are formed to shape an arcuate portion 67. Within the space formed by the shoulder 65 towards the inside of the lower housing portion 41, L-shaped walls 69 and fingers 71 are positioned on the sides of the arcuate portion 67. The L-shaped walls 69 are connected at its two ends to the shoulder. The top edge of the L-shaped wall 69 provides a platform 73. The fingers 71 are connected at their lower end to the floor 57 and project to an opposing end above the end of L-shaped wall 69. Between an L-shaped wall 69 and a side of the finger 71, a slot 75 is provided. A knob 77 is placed on the floor 57 so that the top of the knob 77 extends up slightly above the nadir of the arcuate portion 67.

The upper and lower housing portions 39, 41 are put together to form the battery pack. The screw holes 55 are aligned with the screw sheaths and screws (not shown) are inserted. A container space is formed between the top surface 45, the floor 57 and the side wall 59. Within the container space, multiple battery cells (not shown) can be oriented. The number of battery cells determines the voltage of the battery pack, described above.

The battery latch mechanism 37 includes a latch member, shown in FIGS. 7–10, and a spring 84, shown in FIG. 11. FIG. 7 illustrates an inner side 86 of the latch member 82, and FIG. 8 illustrates an outer side 88 of the latch member 82. The inner side corresponds to the inner side of the battery housing 35 when the housing is assembled. Likewise, the outer side 88 corresponds to the outside of the battery housing 35 when the housing is assembled. At one end 90 towards the top of the latch member 82 a generally rectangular-shaped notch 91 is formed into the inner side 86 so that latch flange 92 protrudes out from the inner side 86. The notch 91 has a back wall 93. The latch flange 92 includes an angled top surface 94 that extends from the end 90 towards a flange tip 96. The bottom surface 97 of the latch flange 92 corresponds with the top wall of the notch 91. As will be described in more detail below, the bottom surface 97 engages with the latching surface 26 to secure the battery pack 12 to the power tool housing 14. As one skilled in the art will appreciate, the bottom surface 93 and the latching surface 26 should be manufactured to such a degree that the entire surfaces engage.

The opposing lower end 98 of the latch member 82 has a generally rounded, or arcuate, shape that corresponds to the shape of the arcuate portion 67 formed into the lower housing portion 41. On the outer side 88, the latch mechanism includes a pushing surface 99 towards the lower end 98. In the preferred embodiment, the pushing surface includes a depression 100 formed into the latch member 82.

Towards the opposing lower end 98, the inner surface has an indentation 101 formed therein so that an arcuate flange 102 surrounds the perimeter of the lower end 98. Between the indentation 100 and the latch flange 92 a bar 104 extends across the width of the latch member 82. The bar 104 extends beyond and protrudes from each latch member side 108. As seen in FIGS. 9 and 10, the bar 104 includes a channel 110 that is positioned along the bar's under side so that the bar 104 has a generally L-shaped cross-section with a lower end 106. The vertex of the L-shaped bar 104 and the channel 110 nominally defines a pivot axis 126 for the latch mechanism 37. On each latch member side 108, a rib 112 protrudes from the sides 108 from the bar 104 towards the opposing lower end 98. The end of the rib 112 has a surface 114 that is angled from the inner side towards the outer side of the latch member.

The dimensions of the notch 91 and position of the latch flange 92 and pivot axis 126 relative the structure of the latch member 82 can affect the performance of the latch mechanism 37. To determine the optimal position of the latch flange and the pivot axis, a latch position angle Ø is determined. As seen in FIG. 10, angle Ø is the angle between the plane formed between the pivot axis 126 and the back wall 93 and the plane formed between the pivot axis 126 and a mid-point of the bottom surface 97. Although any point along the bottom surface can be used to fix the second plane, the mid-point is chosen here because it is understood to be the nominal point where the bottom surface 97 and the latching surface 26 engage. The angle Ø can be modified to adjust the operation of the latch mechanism by moving the pivot axis 126 and the width of the bottom surface 97. The angle Ø is positive when the pivot axis 126 approaches the inner surface 84 and is negative as the pivot axis 126 is more offset from the inner side 84. It has been determined that the performance of the latch mechanism 37 and the mechanical advantage provided thereby improves as the angle Ø approaches 0°. The optimal angle Ø is negative, as shown in FIG. 10.

Referring to FIG. 11, the spring 84, which is preferably made of spring steel, includes a top bar 116 and two side bars 118 perpendicularly integrally formed to the ends of the top bar. Along the edge of the top bar 116 opposing the side bars 118, lip 120 is formed such that the lip 120 is curved away from the top bar 116. Between the side bars 118, the spring 84 includes a generally triangular-shaped center portion 122. The center portion is angled away from the plane of the top and side bars 116, 118 in the direction of lip 120. The end of the center portion 122 can be angled in towards the direction of the side bars 118 forming a tip 124.

Figure 12:
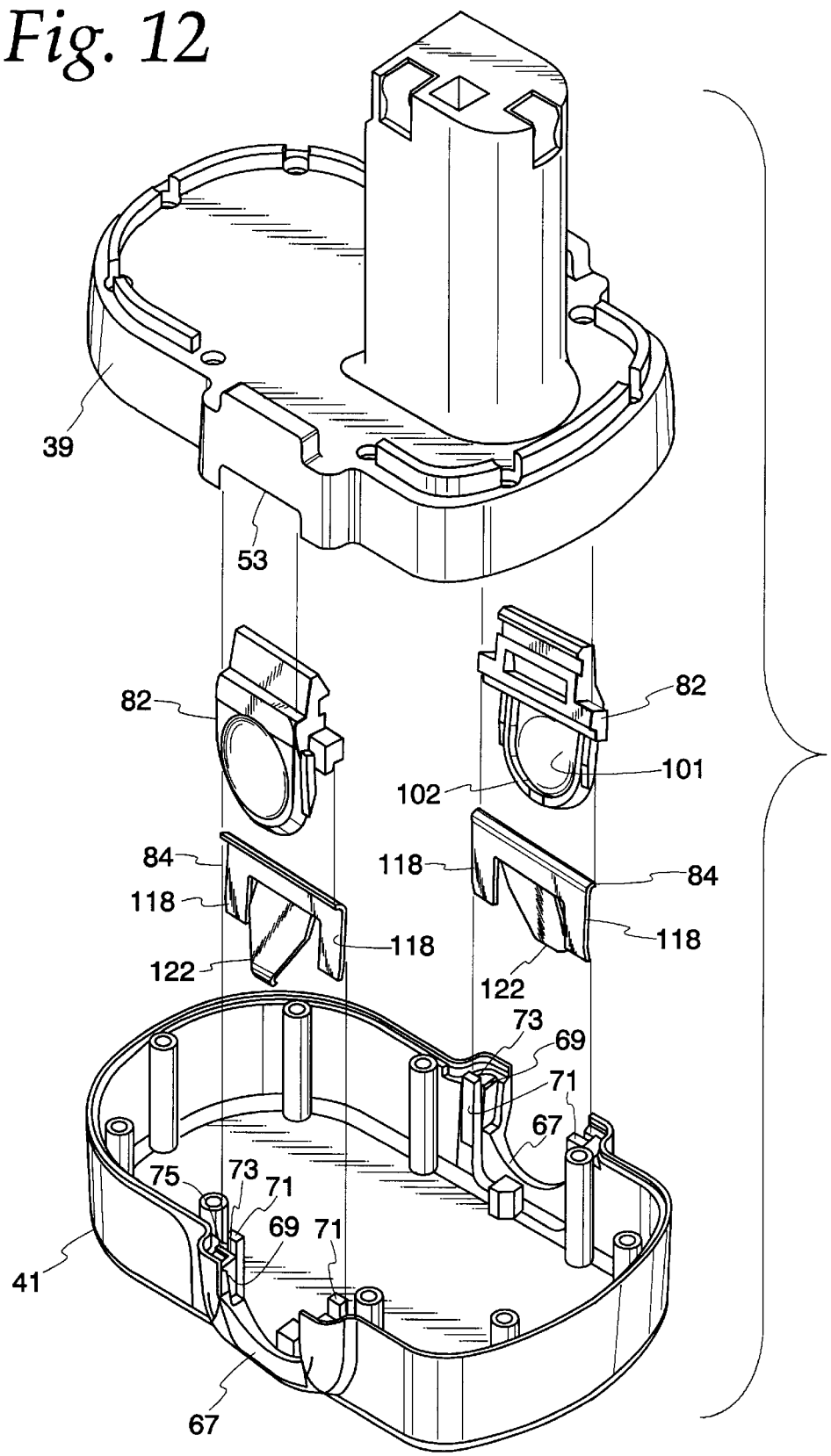
FIG. 12 is an exploded view of the battery pack.

The assembled battery pack 12 is shown in FIG. 12. The side bars 118 of the spring 84 are inserted into the slots 75 in the lower housing portion 41. The lip 120 thereby rests on the platforms 73 to support the spring 84 in the lower housing 41. The spring 84 is arranged in the lower housing 41 so that the center portion 122 is angled towards the outside of the housing 41. The latch member 82 is then snapped into the lower housing portion 41 so that the bar 104 rests on top of the fingers 71. In particular, the bar's lower end 106 fits on top of the lip 120 of the spring 84, and the top of the fingers 71 fit into the channel 110. In addition, the spring's center portion 122 fits into the indentation 101 so that the latch member 82 is positioned on top of the spring 84. The latch member's lower end 98 fits into the arcuate portion 67 in the shoulder 65 of the lower housing portion 41. In addition, the ribs 112 are adjacent the L-shaped walls 69.

Once the latch mechanism 37 is installed into the lower housing position 41, the upper housing portion 39 is placed over the lower housing portion 41 so that the screw holes 55 align with the screw sheaths 63. The housing portions 49 and 41 are held together by screws (not shown) that are threaded through the holes 55 and into the sheaths 63. When the upper housing 39 is properly positioned over the lower housing 41, the latch flange 92 fits into the hood area 53 so that the hood 49 covers the upper end 90 of the latch member 82. As seen in FIG. 4, the latch tip 96 projects out of the hood area 53.

Figure 14:
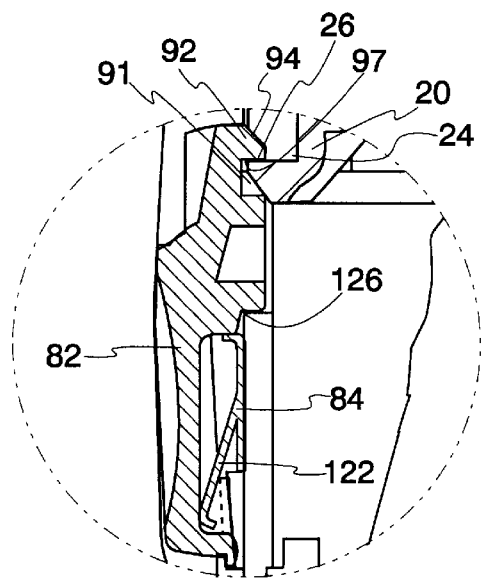
FIG. 14 is an enlarged view of the latch mechanism and housing in the engaged position as shown in FIG. 13.
Figure 15:
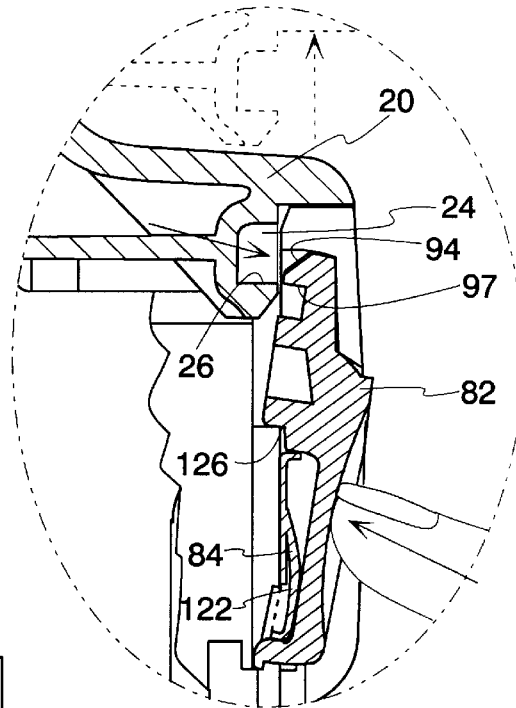
FIG. 15 is an enlarged view of the latch mechanism and housing in a release position as show in FIG. 13.
Figure 13:
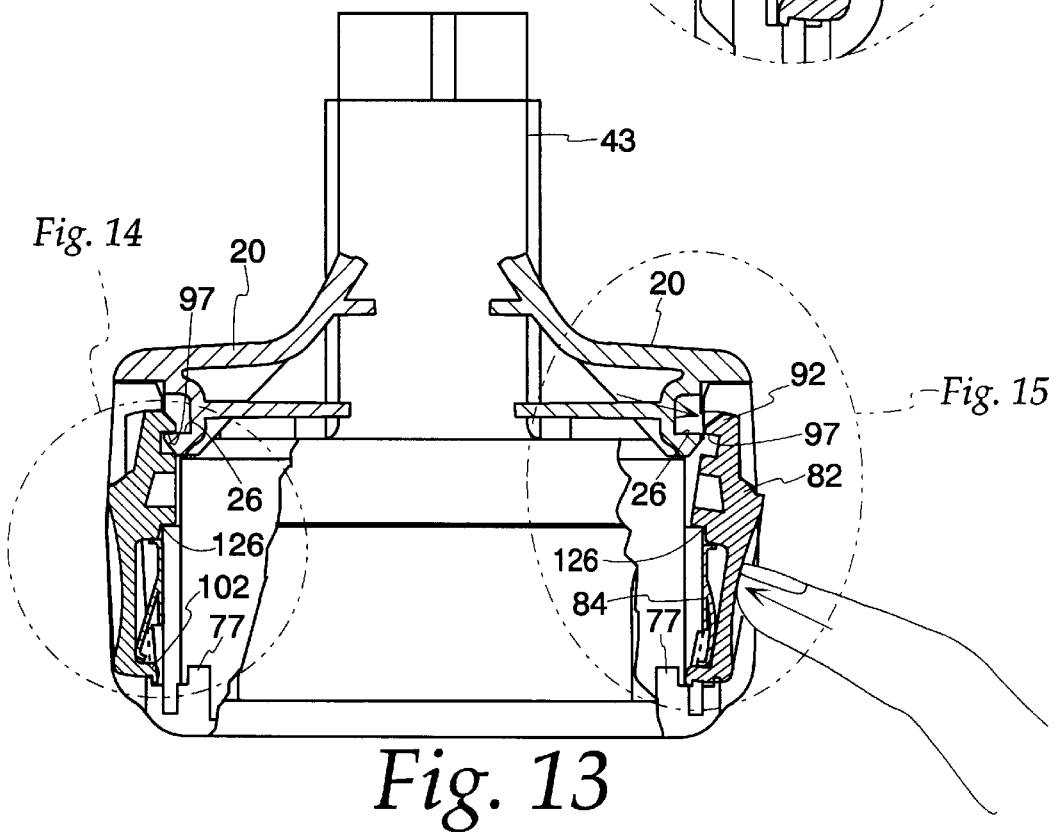
FIG. 13 is a cross-sectional view of the latch mechanism positioned in the battery pack housing.

In operation, the battery latch mechanism 37 is oriented in an engaged position and a release position as seen in FIGS. 13–15. The spring 84 biases the battery latch mechanism 37 into an engaged position where the latch flange 92 is positioned within the recess 24 so that the latch flange 92 rests on the latching surface 26. To remove the battery pack 12 from the power tool 10, a hand grips the power tool housing in the grip portion 18 and a second hand grips the battery pack 12 from underneath. The hand is oriented so that the hand throat is on the underside of the battery pack 12. The thumb and index finger can then press on the pushing surfaces 99 thereby biasing the springs 84 and rotating the latch members 82 around the pivot axes 126. By pressing on the pushing surfaces 99, the latch flanges 92 is moved to a release position and disengaged from the latch surfaces 28 and removed from the recesses 24 thereby removing any obstruction for the battery pack 12 to be removed from the power tool 10. The angled rib surface 114 permits the latch member 82 to rotate about the pivot axis 126 towards the spring's side bars 118. The knob 77 is provided to restrict the arcuate path of the latch member 82 so that the rotation does not over-exert the spring 84.

The position of the pushing surface 99 and the configuration of the latch mechanism 37 provides a mechanical advantage over prior art designs. In particular, the placement of the spring 84 in indentation 101 and opposing the pushing surface 99 allows the force placed on the latch mechanism to directly bias the spring 84. In addition, the location of the pushing pivot axis 126 between the latch flange 92 and the pushing surface 99 provides a mechanical advantage. Furthermore, the performance of the latch mechanism improves because of the ratio of the distances between the latching surface and the pivot point versus the pivot point and the pushing surface. In the embodiment shown that ratio is about 2:1.

To insert the battery pack 12 back into the power tool, the angled top surface butts against the lower end of the recess 24. As the top surface 94 is angled, latch member 82 rotates about the pivot axis 126 so that the latch flange 92 snaps into the recess 24 and engages with the latching surface 26. Alternatively, the thumb and index finger can press on the pushing surface 99 so that the latch flange 92 is extended away from the power tool housing into the release position. When the battery pack 12 is completely inserted into the power tool 10 the latch member can be released inserting the latch flange 92 into the recess 24 and engaging the latching surface 26.

FIGS. 16 and 17 illustrate alternative embodiments of a battery pack 12 connected to a power tool housing 14. FIG. 16 shows a battery pack housing 18 volts. As seen, the size and configuration of the battery latch mechanism 37 is the same as the one described above. As will be understood by those skilled in the art, the latch mechanism 37 can be made in universal dimensions so that it can be used in battery packs of various sizes and voltages. FIG. 17 shows a larger battery pack housing 24, or more, volts where the walls 59 of the lower housing portion 41 is extended. The latch member 82 in this embodiment is also extended while still maintaining the design and mechanical advantages of the latch mechanism described.

Of course, various changes and modifications of the preferred and alternative embodiments described will be apparent to one skilled in the art. Such changes can be made without departing from the spirit and scope of the invention and without diminishing its attendant advantages. It is therefore intended that such changes and modifications be covered by the appended claims.

What is claimed is:

1. A latch mechanism to attach a battery pack having a housing for a power tool, the latch mechanism comprising:
    a latching member having an outer side and an inner side, a latching flange extending from the inner side at one end of a latching portion and a pushing surface on the outer side toward an opposing end of the latching portion; and
    a spring engaged with the inner surface of a latching surface opposing the pushing surface;
    wherein the latching member includes a pivot axis between the latching flange and the pushing surface;
    wherein the latching member moves between an engaged position where the flange is connected to the power tool and a released position where the flange is disconnected from the power tool by depressing on the pushing surface thereby moving the spring; and wherein the distance between the latching surface and the pivot axis is greater than the distance between the pivot axis and the pushing surface.

2. The latch mechanism according to claim 1 wherein the latching member moves about the pivot axis when the pushing surface is depressed.

3. The latch mechanism according to claim 2 wherein an upper end of the spring aligns with the pivot axis.

4. The latch mechanism according to claim 1 wherein the spring comprising:
    a center body that engages in part with the latching member and a first and second side bar integral with the center body wherein the side bars connect with a housing of the battery pack.

5. The latch mechanism according to claim 1 wherein the pushing surface is depressing formed in the outer surface.

6. The latch mechanism according to claim 1 wherein a latch position angle is about 0° with respect to the pivot axis.

7. The latch mechanism according to claim 1 wherein a latch position angle is negative with respect to the pivot axis.

8. A battery operated tool comprising:
    a power tool housing having a latching surface formed into an outer surface of the power tool housing;
    a battery pack having a housing to hold battery cells to power the tool; and
    a battery latch mechanism to removably attach the battery pack to the power tool housing, the battery latch mechanism including a latching member with an outer side and an inner side, a latching flange extending from the inner side at one end of the latching member and a pushing surface on the outer side toward an opposing end of the latching member wherein the latching member is biased between an engaged position where the flange is removably connected onto the latching surface and a release position where the flange is disconnected from the latching surface by depressing on the pushing surface.

9. The power tool according to claim 8 wherein the latching surface is a recess formed in the power tool housing.

10. The power tool according to claim 8 further comprising a spring biased between the battery pack housing and the inner side of the latch portion.

11. The power tool according to claim 10 wherein the spring comprising a center body engaged against the latching member and first and second side bars engaged into a first and second slot formed in the battery pack housing.

12. The power tool according to claim 8 wherein the battery pack housing includes a hood to enclose the end of the latching portion.

13. The power tool according to claim 8 wherein the latching member includes a pivot axis between the latch flange and the pushing surface and wherein the latching member moves about the pivot axis between the engaged position and the release position when the pushing surface is depressed.

14. The power tool according to claim 13 wherein a latch position angle is about 0° with respect to the pivot axis.

15. The power tool according to claim 7 wherein a latch position angle is negative with respect to the pivot axis.

16. A battery latch mechanism to removably attach a battery pack to a power tool having a housing, the battery latch mechanism comprising:

a latching member having a latching flange at one end, a pushing surface toward an opposing end and a pivot axis between the flange and pushing surface; a spring engaged with the latching member opposing the pushing surface;

wherein the latching member pivots about the pivot axis between an engaged position where the flange is connected to the power tool and a release position where the flange is disconnected from the power tool by depressing on the pushing surface thereby moving the spring; and wherein the distance between the latching surface and the pivot axis is greater than the distance between the pivot axis and the pushing surface.

17. The battery latch mechanism according to claim 16 wherein the flange extends from an inner surface of the latching member and the pushing surface is formed on the outer surface.

18. The battery latch mechanism according to claim 16 wherein the flange is adapted to extend into a recess in the power tool housing.

19. The battery latch mechanism according to claim 16 wherein an upper end of the spring aligns with the pivot axis.

20. The latch mechanism according to claim 16 wherein the spring comprising:

a center body that engages in part with the latching member; and a first and second side bar integral with the center body wherein the side bars connect with a housing of the battery pack.

21. The latch mechanism according to claim 16 wherein the pushing surface is a depression formed in the outer surface.

22. The latch mechanism according to claim 16 wherein a latch position angle is about 0° with respect to the pivot axis.

23. The latch mechanism according to claim 16 wherein a latch position angle is negative with respect to the pivot axis.

24. A battery operated power tool comprising:

a power tool housing having a latching surface formed into an outer surface of the power tool housing;

a battery pack having a housing to hold battery cells; and a battery latch mechanism to removably attach the battery pack to the power tool housing, the battery latch mechanism including a latching member with a latching flange at one end, a pushing surface toward an opposing end, and a pivot axis between the flange and the pushing surface wherein the latching member moves about the pivot axis between an engaged position where the flange is removably connected onto the latching surface and a release position where the flange is disconnected from the latching surface by depressing on the pushing surface.

25. The power tool according to claim 24 wherein the latching surface is a recess formed in the power tool housing.

26. The power tool according to claim 24 further comprising a spring biased between the battery pack housing and a side of the latching member opposing the pushing surface.

27. The power tool according to claim 26 wherein the spring comprising a center body engaged against the latching member and first and second side bars engages into a first and second slot formed in the battery pack housing.

28. The power tool according to claim 24 wherein the battery pack housing includes a hood to enclose the one end of the latching portion.

29. The power tool according to claim 24 wherein the latch flange is on an inner side of the latching member and the pushing surface is on an opposing inner side of the latching member.

30. The power tool according to claim 24 wherein a latch position angle is about 0° with respect to the pivot axis.

31. The power tool according to claim 24 wherein a latch position angle is negative with respect to the pivot axis.

* * * * *